United States Patent
Hu et al.

(10) Patent No.: US 11,436,876 B2
(45) Date of Patent: *Sep. 6, 2022

(54) SYSTEMS AND METHODS FOR DIAGNOSING PERCEPTION SYSTEMS OF VEHICLES BASED ON TEMPORAL CONTINUITY OF SENSOR DATA

(71) Applicant: GM GLOBAL TECHNOLOGY OPERATIONS LLC, Detroit, MI (US)

(72) Inventors: Yao Hu, Sterling Heights, MI (US); Wei Tong, Troy, MI (US); Wen-Chiao Lin, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 454 days.

This patent is subject to a terminal disclaimer.

(21) Appl. No.: 16/671,345

(22) Filed: Nov. 1, 2019

(65) Prior Publication Data
US 2021/0134085 A1  May 6, 2021

(51) Int. Cl.
*G07C 5/08*  (2006.01)
*G06F 17/18*  (2006.01)
(Continued)

(52) U.S. Cl.
CPC .......... *G07C 5/0808* (2013.01); *G06F 17/18* (2013.01); *G06N 3/0454* (2013.01); *G06N 3/08* (2013.01)

(58) Field of Classification Search
CPC ........ G06N 3/0454; G06N 3/08; G06N 3/088; G06V 10/82; G06V 20/56; G06V 10/255;
(Continued)

(56) References Cited

U.S. PATENT DOCUMENTS 7,460,951 B2 * 12/2008 Altan ..................... G06V 20/56
701/518
8,704,653 B2 *  4/2014 Seder ..................... G06K 9/629
340/436

(Continued)

FOREIGN PATENT DOCUMENTS

EP        2244104 A2 * 10/2010 ........... G01S 13/723

OTHER PUBLICATIONS

U.S. Appl. No. 16/139,782, filed Sep. 24, 2018, Hu et al.
(Continued)

*Primary Examiner* — Babar Sarwar

(57) ABSTRACT

A comparing module receives first data regarding surroundings of a vehicle from a plurality of sensors in the vehicle, receives second data regarding the surroundings from the plurality of sensors after receiving the first data, compares the first data to the second data, and determines a first difference between the first data and the second data based on the comparison of the first data to the second data. A perception module generates a first set of perception results based on the first data, generates a second set of perception results based on the second data, and determines a second difference between the first data and the second data based on the first set of perception results and the second set of perception results. A diagnostics module determines whether one of the sensors or the perception module is faulty based on a combination of the first difference and the second difference.

18 Claims, 9 Drawing Sheets

(51) Int. Cl.
  *G06N 3/04* (2006.01)
  *G06N 3/08* (2006.01)
(58) Field of Classification Search
  CPC ...... G06V 10/768; G06V 10/98; G06V 20/58;
    G06V 20/582; G06V 30/2552; B60W
    50/0205; B60W 50/14; G06F 17/18;
    G06F 40/30; G06K 9/6264; G06K
    9/6271; G06K 9/6289; G06K 9/6293;
    G07C 5/0808; G08G 1/166
  See application file for complete search history.

(56) References Cited

U.S. PATENT DOCUMENTS

| | | | | |
|---|---|---|---|---|
| 9,274,525 | B1* | 3/2016 | Ferguson | B60W 10/20 |
| 10,031,224 | B2* | 7/2018 | Aoki | G01S 13/345 |
| 10,981,577 | B1* | 4/2021 | Hu | G06N 3/0454 |
| 2005/0174222 | A1* | 8/2005 | Kikuchi | G01S 13/931 |
| | | | | 701/45 |
| 2007/0073473 | A1* | 3/2007 | Altan | G06K 9/629 |
| | | | | 701/518 |
| 2009/0010494 | A1* | 1/2009 | Bechtel | B60R 1/00 |
| | | | | 382/104 |
| 2009/0045999 | A1* | 2/2009 | Samukawa | G01S 17/931 |
| | | | | 342/70 |
| 2012/0053755 | A1* | 3/2012 | Takagi | G01S 7/4808 |
| | | | | 701/1 |
| 2014/0142800 | A1* | 5/2014 | Zeng | G01S 13/867 |
| | | | | 701/30.6 |
| 2014/0355827 | A1* | 12/2014 | Ogawa | G06V 20/56 |
| | | | | 382/103 |
| 2015/0331098 | A1* | 11/2015 | Luebbert | G01S 7/354 |
| | | | | 342/91 |
| 2017/0147888 | A1* | 5/2017 | Zeng | G01S 13/931 |
| 2017/0307746 | A1* | 10/2017 | Rohani | G01S 7/412 |
| 2018/0072320 | A1* | 3/2018 | Fattal | H04N 13/302 |
| 2018/0150701 | A1* | 5/2018 | Kang | G06N 3/04 |
| 2018/0307748 | A1* | 10/2018 | Freilinger | G06F 16/3346 |
| 2019/0064810 | A1* | 2/2019 | Jiang | G06V 20/64 |
| 2019/0258878 | A1* | 8/2019 | Koivisto | G06V 20/584 |
| 2019/0311546 | A1* | 10/2019 | Tay | G06T 5/50 |
| 2020/0019160 | A1* | 1/2020 | McArthur | G01S 13/862 |
| 2020/0074770 | A1* | 3/2020 | Piewek | G07C 5/008 |
| 2020/0098394 | A1* | 3/2020 | Levinson | G01S 7/4802 |
| 2020/0158864 | A1* | 5/2020 | Achour | H04W 4/40 |
| 2020/0209853 | A1* | 7/2020 | Leach | G01S 13/86 |
| 2020/0255030 | A1* | 8/2020 | Yamamoto | G01S 17/42 |
| 2020/0257306 | A1* | 8/2020 | Nisenzon | G05D 1/0274 |
| 2020/0355820 | A1* | 11/2020 | Zeng | G01S 7/417 |
| 2021/0124344 | A1* | 4/2021 | Hu | G05D 1/0088 |
| 2021/0295171 | A1* | 9/2021 | Kamenev | G06N 3/0445 |
| 2022/0004818 | A1* | 1/2022 | Koopman | G06V 10/98 |

OTHER PUBLICATIONS

U.S. Appl. No. 16/527,561, filed Jul. 31, 2019, Hu et al.
U.S. Appl. No. 16/661,126, filed Oct. 23, 2019, Hu et al.
Ramanagopal, M. S. et al. "Failing to Learn: Autonomously Identifying Perception Failures for Self-driving Cars". IEEE Robotics and Automation Letters. Jul. 2018; 8 pages.
Dokhanchi, Adel et al. "Evaluating Perception Systems for Autonomous Vehicles using Quality Temporal Logic". 18th International Conference, RV 2018, Limassol, Cyprus, Nov. 10-13, 2018, Proceedings; 8 pages.

* cited by examiner

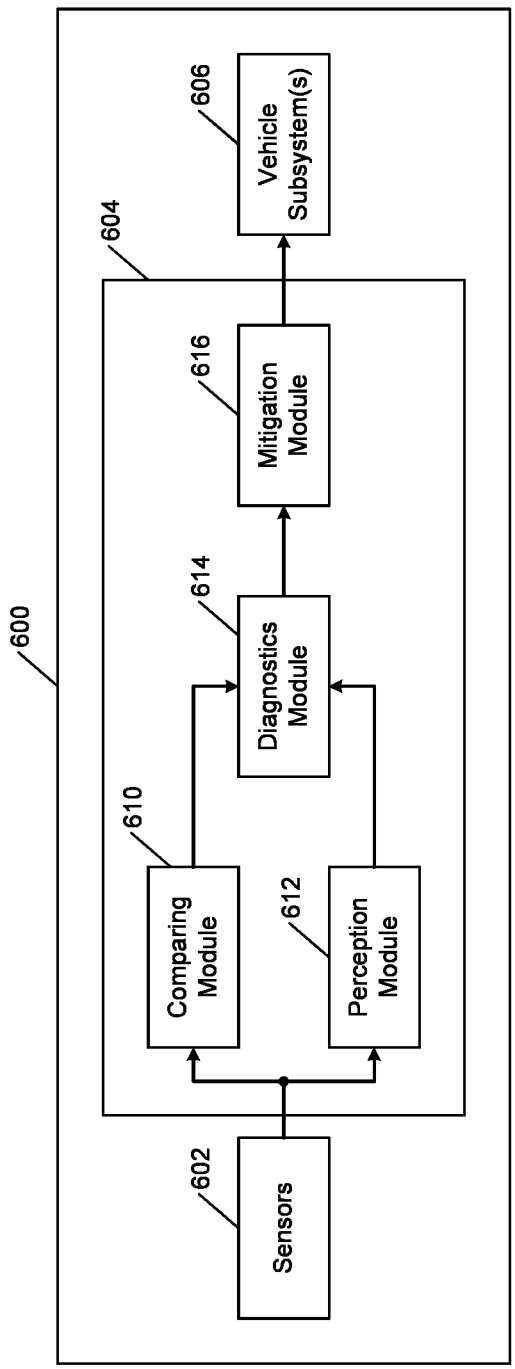
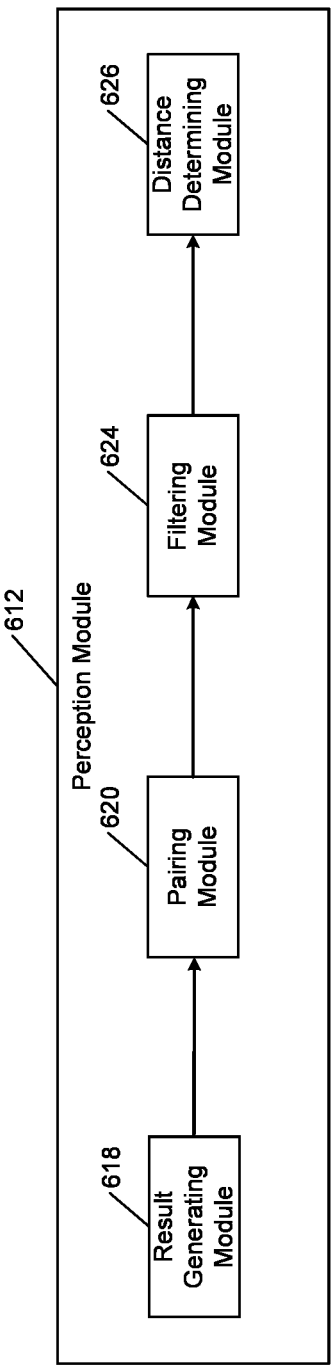
FIG. 8A
FIG. 8B

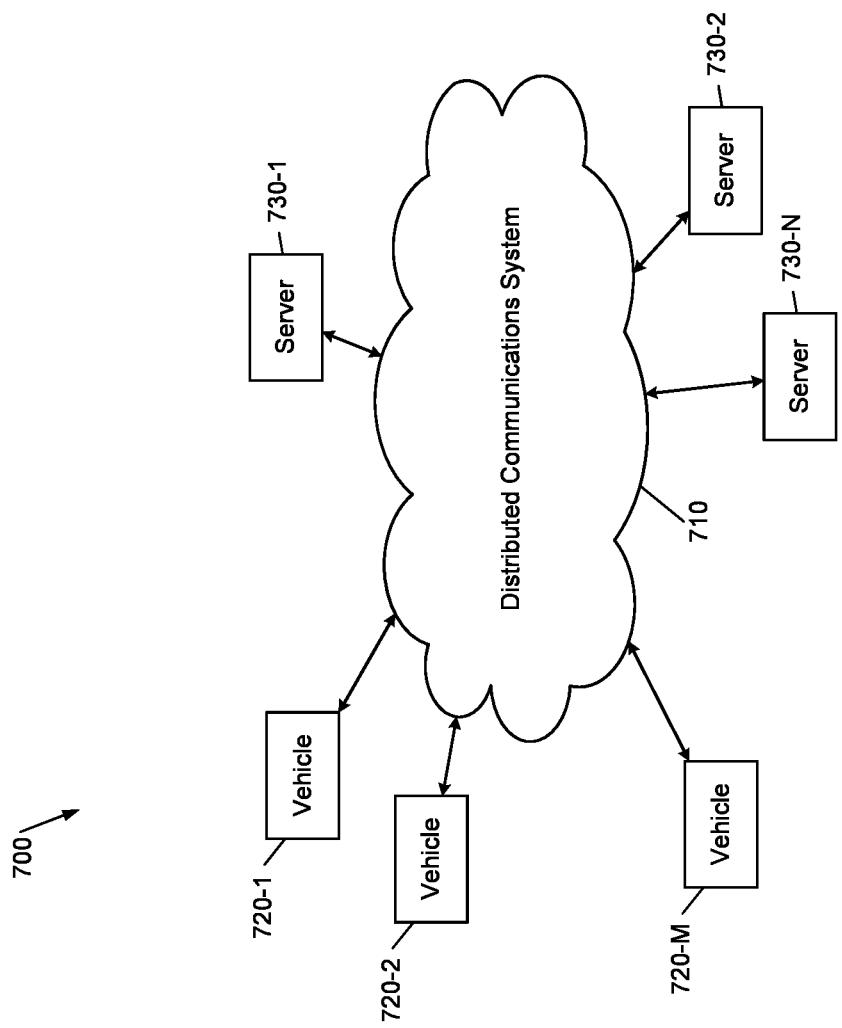

SYSTEMS AND METHODS FOR DIAGNOSING PERCEPTION SYSTEMS OF VEHICLES BASED ON TEMPORAL CONTINUITY OF SENSOR DATA

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to perception systems used in autonomous vehicles and more particularly to systems and methods for diagnosing perception systems of vehicles based on temporal continuity of sensor data.

Perception systems used in autonomous vehicles utilize various sensors to sense surroundings of the vehicles. The perception systems receive data from these sensors regarding vehicle surroundings. For example, these sensors include cameras and other (e.g., radar, LIDAR, sonar, etc.) sensors situated at various locations within and outside the vehicles that provide the data to the perception systems. The perception systems process the data received from these sensors and determine the surroundings of the vehicles. For example, the surroundings may include other vehicles, pedestrians, road signs, traffic signs, buildings, landmarks, and so on. The autonomous vehicles' subsystems can control the vehicles based on these determinations. These determinations can also be used to inform and warn drivers of the conditions surrounding the vehicles.

SUMMARY

A system comprises a comparing module, a perception module, and a diagnostics module. The comparing module is configured to receive first data regarding surroundings of a vehicle from a plurality of sensors in the vehicle, receive second data regarding the surroundings from the plurality of sensors after receiving the first data, compare the first data to the second data, and determine a first difference between the first data and the second data based on the comparison of the first data to the second data. The perception module is configured to generate a first set of perception results based on the first data, generate a second set of perception results based on the second data, and determine a second difference between the first data and the second data based on the first set of perception results and the second set of perception results. The diagnostics module is configured to determine whether one of the sensors or the perception module is faulty based on a combination of the first difference and the second difference.

In another feature, the system further comprises a mitigation module configured to perform a mitigation procedure in response to the diagnostics module diagnosing a fault in one of the sensors or the perception module.

In another feature, the diagnostics module is configured to determine whether one of the sensors or the perception module is faulty based on a plurality of each of the first difference and the second difference averaged over a moving window.

In another feature, in response to the vehicle being stationary, the comparing module is configured to compare the first data to the second data by performing an element-wise comparison between elements of the first data and the second data.

In another feature, in response to the vehicle being in motion, the comparing module is configured to compare the first data to the second data by identifying features from the first data and the second data and by matching the features, and to determine the first difference between the first data and the second data based on the matching.

In other features, the comparing module comprises a plurality of identical neural network models trained to identify features in input data and to output the features using identical weights. The comparing module is configured to input the first and second data respectively to first and second neural network models of the plurality of neural network models, receive first and second features respectively from the first and second neural network models, calculate Euclidean distance between the first and second features, and generate a score by normalizing the Euclidean distance. The score indicates the first difference between the first data and the second data.

In other features, the comparing module comprises a pairing module configured to pair objects in the first set of perception results with objects in the second set of perception results based on intersection over union values for all pairs of the objects. The comparing module comprises a filtering module configured to filter objects with coordinates proximate to outer edges of the first and second sets of perception results from the paired objects. The comparing module comprises a distance determining module configured to determine Euclidean distance between the first and second sets of perception results based on the filtered paired objects. The Euclidean distance represents the second difference.

In another feature, the pairing module is configured to pair the objects in the first set of perception results with objects in the second set of perception results based on a decreasing order of the intersection over union values for all the pairs of the objects in an iterative manner, and to sort the first and second sets of perception results using the paired objects.

In another feature, the filtering module is configured to generate filtered sorted first and second sets of perception results after filtering the objects with coordinates proximate to the outer edges of the first and second sets of perception results from the paired objects.

In other features, the distance determining module is configured to determine the Euclidean distance between the first and second sets of perception results by generating a first mean value of distances between the paired objects in the filtered sorted first and second sets of perception results, generating a second mean value based on types of the paired objects using a lookup table, scaling the first and second mean values by respective weights, and combining the weighted first and second mean values.

In still other features, a method comprises receiving first data regarding surroundings of a vehicle from a plurality of sensors in the vehicle, receiving second data regarding the surroundings from the plurality of sensors after receiving the first data, comparing the first data to the second data, and determining a first difference between the first data and the second data based on the comparison of the first data to the second data. The method further comprises generating a first set of perception results based on the first data using a perception module, generating a second set of perception results based on the second data using the perception module, and determining a second difference between the first data and the second data based on the first set of perception results and the second set of perception results using the perception module. The method further comprises determining whether one of the sensors or the perception module is faulty based on a combination of the first difference and the second difference.

In another feature, the method further comprises performing a mitigation procedure in response to diagnosing a fault in one of the sensors or the perception module.

In another feature, the method further comprises determining whether one of the sensors or the perception module is faulty by averaging a plurality of each of the first difference and the second difference over a moving window.

In another feature, the method further comprises, in response to the vehicle being stationary, comparing the first data to the second data by performing an element-wise comparison between elements of the first data and the second data.

In another feature, the method further comprises, in response to the vehicle being in motion, comparing the first data to the second data by identifying features from the first data and the second data and matching the features, and determining the first difference between the first data and the second data based on the matching.

In other features, the method further comprises selecting first and second neural network models from a plurality of identical neural network models trained to identify features in input data and to output the features using identical weights, inputting the first and second data respectively to the first and second neural network models, receiving first and second features respectively from the first and second neural network models, calculating Euclidean distance between the first and second features, and generating a score by normalizing the Euclidean distance. The score indicates the first difference between the first data and the second data.

In other features, the method further comprises pairing objects in the first set of perception results with objects in the second set of perception results based on intersection over union values for all pairs of the objects, filtering objects with coordinates proximate to outer edges of the first and second sets of perception results from the paired objects, and determining Euclidean distance between the first and second sets of perception results based on the filtered paired objects. The Euclidean distance represents the second difference.

In other features, the pairing further comprises pairing the objects in the first set of perception results with objects in the second set of perception results based on a decreasing order of the intersection over union values for all the pairs of the objects in an iterative manner, and sorting the first and second sets of perception results using the paired objects.

In another feature, the filtering further comprises generating filtered sorted first and second sets of perception results after filtering the objects with coordinates proximate to the outer edges of the first and second sets of perception results from the paired objects.

In other features, the method further comprises determining the Euclidean distance between the first and second sets of perception results by generating a first mean value of distances between the paired objects in the filtered sorted first and second sets of perception results, generating a second mean value based on types of the paired objects using a lookup table, scaling the first and second mean values by respective weights, and combining the weighted first and second mean values.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 8A and 8B show a functional block diagram of a system for diagnosing and mitigating faults in a perception system of a vehicle according to the present disclosure;

FIG. 9A shows a simplified example of a distributed computing system that can implement the systems and methods shown in FIGS. 1-8B.

In the drawings, reference numbers may be reused to identify similar and/or identical elements.

DETAILED DESCRIPTION

Figure 1:
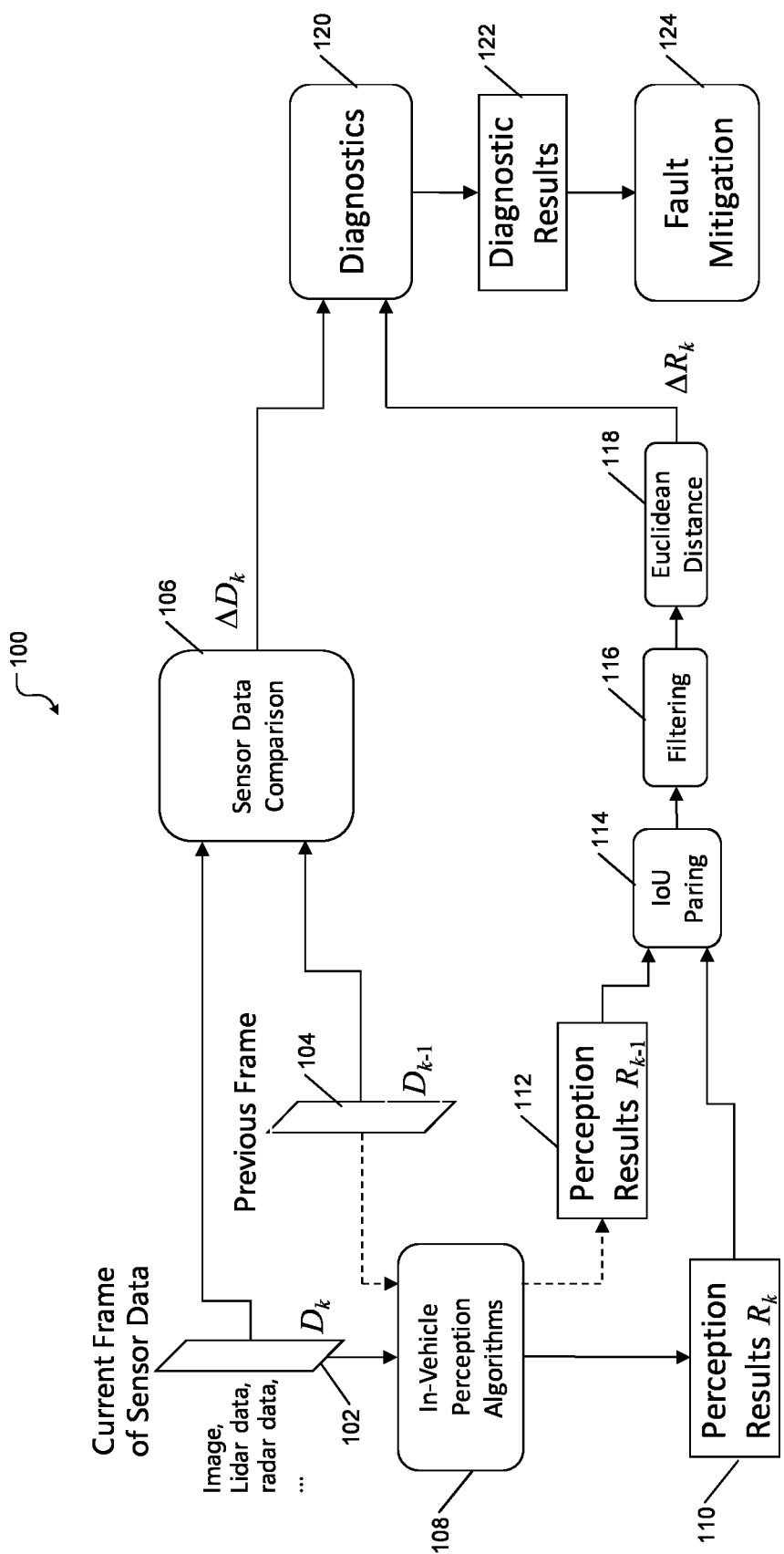
FIG. 1 shows an overall architecture of a system for diagnosing faults in a perception system of a vehicle according to the present disclosure.

Perception systems used to determine vehicle surroundings are subject to failures, which need to be detected. Online diagnostics of the perception systems can be challenging because when the vehicle is driven on the road, it is difficult to determine ground truth in real time, where ground truth is reference information provided by direct observation (i.e., empirical evidence) as opposed to information provided by inference. The present disclosure provides systems and methods that diagnose the perception systems without ground truth. The systems and methods calculate temporal continuities of sensor data and perception results, and determine faults based on discontinuities. The systems and methods can detect and identify faults in the perception system on the fly during runtime.

The framework for calculating temporal continuity and generating diagnostic results includes calculating the temporal continuity in sensor data by paring two sequential frames or sets of data received from the sensors. The framework further includes fault isolation logic that uses aggregated continuity information in a time window. Notably, the systems and methods do not determine and do not use spatial discontinuity in the sensor data. The systems and methods improve user experience by providing fault alerts and optimizing fleet management. The systems and methods improve reliability of the perception systems and enhance perceived quality of vehicles without additional hardware.

Specifically, the systems and methods of the present disclosure use temporal continuity information of raw data and perception results generated based on the raw data to detect and isolate faults in the perception systems. The temporal continuity represents change between two frames. The systems and methods calculate the temporal continuity between two sequential frames. For perception results, the systems and methods use a paring method, intersection over union (IoU) rate, filtering, and Euclidean distance. For raw data, the systems and methods use two different approaches depending on the state of the vehicle. The systems and methods use L2 norm, which involves determining errors based on pixel-wise comparisons between two frames and aggregating the errors, when the vehicle is idling. The systems and methods use feature matching when the vehicle is moving.

The systems and methods make diagnostic decisions based on a combination of continuity values obtained from direct comparison of the raw data from two frames (performed using L2 norm or feature matching) and continuity values obtained from perception results generated based on the raw data. The systems and methods aggregate continuity information in a time window and compare continuity with different thresholds to isolate faults in sensors and in the perception system. Further, the systems and methods can mitigate the detected faults. For example, the systems and methods can disengage the self-driving feature, send alerts to the driver, smoothly pullover, and/or ignore a faulty perception channel in fusion (i.e., isolate and disregard a faulty channel when channel redundancy is available). These and other features of the systems and methods are described below in detail.

The present disclosure is organized as follows. An overall architecture of a system for diagnosing faults in a perception system of a vehicle is shown and described with reference to FIG. 1. A method used for pairing objects found in two data frames based on the IoU rate is shown and described with reference to FIGS. 2 and 3. An example of a lookup table used to determine a value based on the types or classes for the objects in a pair is shown in FIG. 4. The value indicates the similarity of types of the objects in a pair. Next, determining a difference between two data frames based on perception results, which includes pairing, filtering, and determining Euclidean distance is described. Thereafter, determining a difference between raw data from two frames for a stationary vehicle is described. For a moving vehicle, a feature matching based system for determining a difference between raw data from two frames is shown and described with reference to FIG. 5. A neural network based system for determining a difference between raw data from two frames is shown and described with reference to FIG. 6. A diagnostic method is shown and described with reference to FIG. 7. A system for diagnosing and mitigating faults by utilizing the systems, methods, and teachings described with reference to FIGS. 1-7, is shown and described with reference to FIGS. 8A and 8B. A distributed computing system that can implement the systems and methods of FIGS. 1-8B is shown and described with reference to FIGS. 9A and 9B.

When a sensor onboard a vehicle captures data from an object around the vehicle, the raw data from the sensor is sent to a perception system for processing. The perception system not only composes an image of the object from the raw data but also provides a representation of the object in a bounded box with positional coordinates of the object indicating the position of the object at the time of sensing the object. The perception system further classifies the object (e.g., provides an indication about the type or class of the object, whether the object is a vehicle, a traffic sign, a landmark, a pedestrian, and so on).

Errors can occur in the representation of the object generated by the perception system due to a faulty sensor or a fault in the processing performed by the perception system. When the sensor is faulty, the raw data may not be continuous, and consequently the representation of the object may be inaccurate. When the fault is in the processing performed by the perception system, the raw data received from the sensor may be continuous, and yet the representation of the object may be inaccurate due to an error in the processing of raw data performed by the perception system. The systems and methods of the present disclosure identify whether the fault is in the raw data received from the sensor or in the processing of the raw data performed by the perception system and mitigate the fault.

The systems and methods of the present disclosure are robust because they use inputs from two disparate information channels. The systems and methods use raw data from sensors in a first input channel and use perception results generated by the perception system based on the raw data in a second input channel. The systems and methods analyze the two inputs differently since the two inputs include different types of data, and then combine the results of the analyses of both the inputs. Accordingly, the systems and methods of the present disclosure can pinpoint errors as originating in the raw data due to a sensor fault or in the processing performed by the perception system due to a failure in the processing system.

FIG. 1 shows an overall architecture of a system 100 for diagnosing faults in a perception system of a vehicle according to the present disclosure. In the system 100, D denotes raw data from the sensors, and R denotes perception results generated based on the raw data. k and k−1 respectively denote current and previous frames of data captured by the sensors at times t and t−1, for example.

In a first channel of the system 100, raw data $D_k$ and $D_{k-1}$ from two sequential frames (shown at 102 and 104) are compared at 106 and a first difference $\Delta D_k$ between the two frames is determined. In a second channel of the system 100, perception results $R_k$ and $R_{k-1}$ are respectively generated at 108 based on the raw data $D_k$ and $D_{k-1}$. The perception results $R_k$ and $R_{k-1}$ (shown at 110 and 112) are processed at 114, 116, and 118 and a second difference $\Delta R_k$ between the two frames is determined.

Diagnostics are performed at 120 based on a combination of both the differences $\Delta D_k$ and $\Delta R_k$. A diagnostic result 122 is generated based on both the differences $\Delta D_k$ and $\Delta R_k$. Fault mitigation is performed at 124 based on the diagnostic result 122. The processing performed by the system 100 can be performed in the vehicle, in cloud (e.g., by one or more servers shown in FIGS. 9A and 9B), or partly in the vehicle and partly in cloud.

Initially, the second channel of the system 100 involving generating the perception results $R_k$ and $R_{k-1}$, and generating the second difference $\Delta R_k$ based on the perception results $R_k$ and $R_{k-1}$ by performing pairing, filtering, determining Euclidean distance is described below with reference to FIGS. 2-4. Subsequently, the first channel of the system 100 involving generating the first difference $\Delta D_k$ between the two frames based on the raw data $D_k$ and $D_{k-1}$ from the two frames is described with reference to FIGS. 5 and 6.

Figure 2:
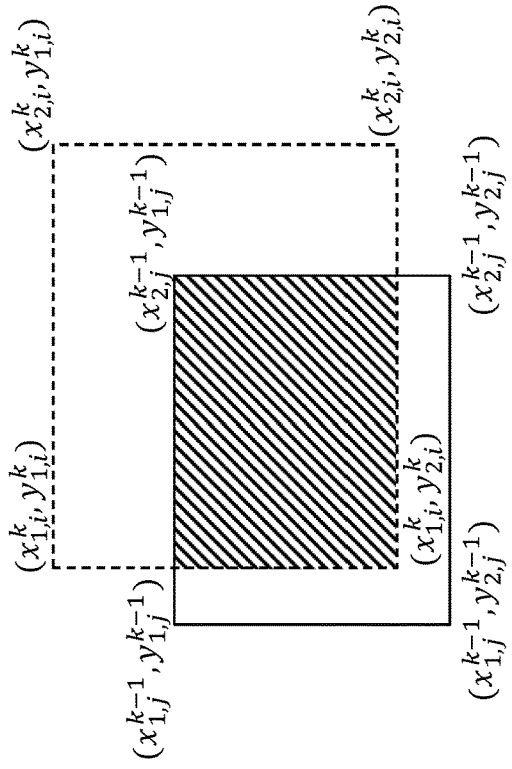
FIG. 2 shows a method used for pairing objects in two frames of data received from sensors that is performed based on an intersection over union (IoU) rate.
Figure 3:
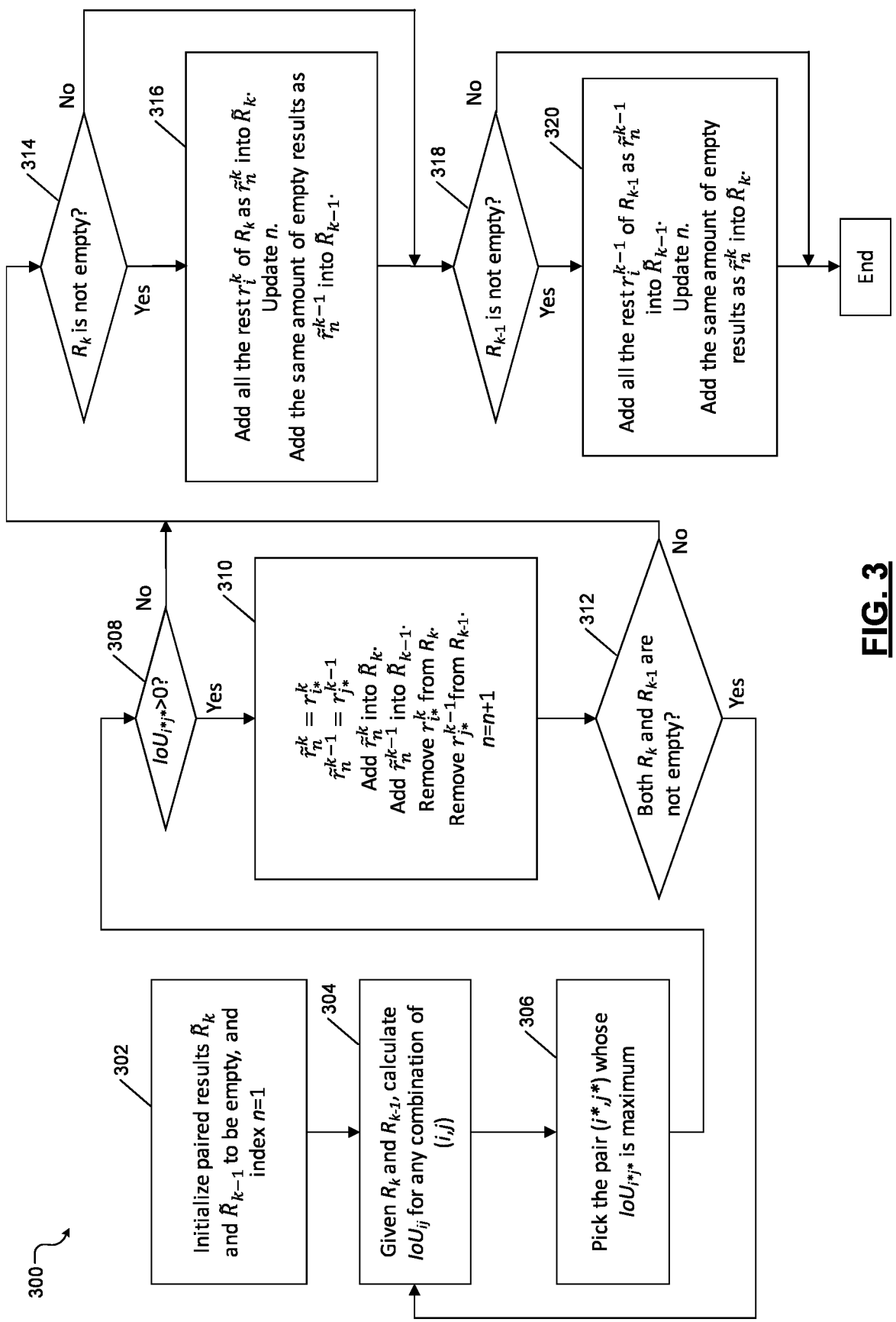
FIG. 3 shows a flowchart of the method used for pairing objects in two frames of data received from sensors that is performed based on the IoU rate.
Figures 4, 5:
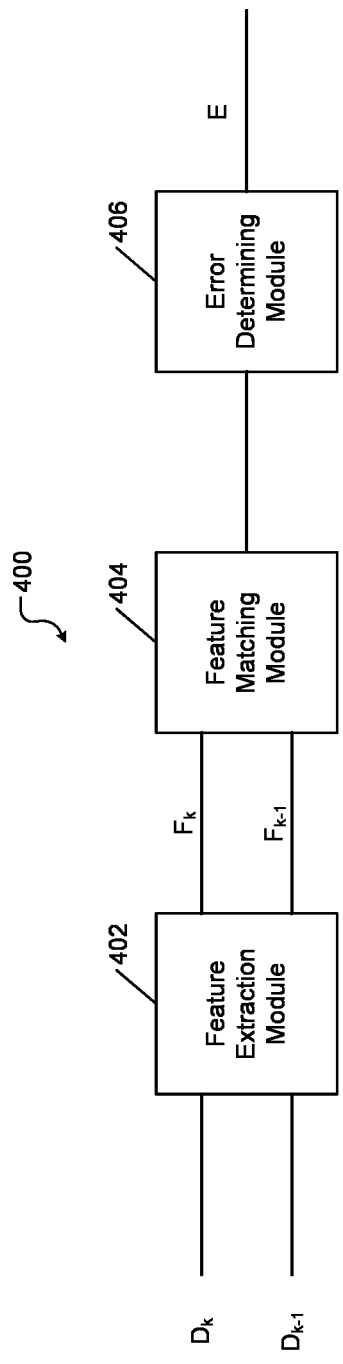
FIG. 4 shows an example of a lookup table used to determine a value based on the types or classes for objects in a pair.
FIG. 5 shows a feature matching based system for determining a difference between two frames.

FIGS. 2 and 3 show pairing of objects found in two consecutive frames performed based on intersection over union (IoU) rate. In FIG. 2, a perception result $R_k$ includes results for objects $r_i$ in a frame k. The results include positions of the objects $r_i$ in terms of their coordinates. The results further include the type or class of the objects $r_i$ denoted by $C_i^k$ (whether the object is a vehicle, a pedestrian, etc.). A perception result $R_{k-1}$ includes results for objects $r_j$ in a frame k−1. The results include positions of the objects $r_j$ in terms of their coordinates. The results further include the type or class of the objects $r_j$ denoted by $C_j^{k-1}$ (whether the object is a vehicle, a pedestrian, etc.). The perception results $R_k$ and $R_{k-1}$ are called perception result vectors, each comprising objects as elements. For each object (e.g., for i=1 and j=1), an intersection over union (IoU) rate $IoU_{ij}$ is calculated as a ratio of area of intersection (shown shaded) to area of union of bounding boxes based on the coordinates of the object in the frames k and k−1.

Note that the number of objects in each perception result vector (i.e., the number of objects in frames k and k−1) may differ due to various reasons. For example, the differences may be due to some objects from frame k−1 moving out and being absent in frame k, some objections absent in frame k−1 moving in and being present in frame k, an error occurring in generating the perception results, and so on. Further, an object $r_i$ in frame k−1 may not necessarily correspond to (i.e., may not be the same as) the object $r_i$ in frame k (e.g., due to movement of the object from time t−1 to t). A process of identifying or determining which object in frame k is the same as the object $r_i$ in frame k−1 is called object pairing and is explained below.

FIG. 2 shows paired objects in frames k and k−1 using arrows drawn between the objects. For example, the object $r_1^k$ in frame k is the object $r_2^{k-1}$ in frame k−1; the object $r_2^k$ in frame k is the object $r_5^{k-1}$ in frame k−1; and so on. Some objects (e.g., objects moving in or out) may be unpaired (e.g., $r_4^{k-1}$ in frame k−1).

The object pairing is performed as follows. Initially, the $IoU_{ij}$ rate is calculated for all objects i and j. Then which pair has the maximum IoU rate is determined. For example, in the example shown, the pair $r_1^k$ and $r_2^{k-1}$ has the maximum IoU rate. Thus, the objects $r_1^k$ and $r_2^{k-1}$ have the highest probability of being the same object. Therefore, the objects $r_1^k$ and $r_2^{k-1}$ are paired with each other. Then the objects $r_1^k$ and $r_2^{k-1}$ are removed from the pool of objects, and the same technique is applied to find the next pair until one of the two lists of objects is exhausted (empty). If IoU is zero for an object or if one of the lists is empty, the objects with zero IoU and the remaining objects in the other list are indicated as unpaired.

After the objects are paired, the resultant vectors are called sorted vectors. A notation ~ is used to indicate a sorted vector (i.e., after pairing). In the example shown, the sorted vectors are $R_k^\sim = \{r_1^{\sim k}, r_2^{\sim k}, r_3^{\sim k}, r_4^{\sim k}\} = \{r_1^k, r_2^k, r_3^k, r_4^k\}$ and $R_{k-1}^\sim = \{r_1^{\sim k-1}, r_2^{\sim k-1}, r_3^{\sim k-1}, r_4^{\sim k-1}, r_5^{\sim k-1}\} = \{r_2^{k-1}, r_5^{k-1}, r_1^{k-1}, r_3^{k-1}, r_4^{k-1}\}$.

FIG. 3 shows a method 300 for performing the IoU based pairing. At 302, control initializes paired perception results (sorted vectors) $R_k^\sim$ and $R_{k-1}^\sim$ to be empty, and initializes index n=1. At 304, given $R_k$ and $R_{k-1}$, control calculates IoU for any combination of (i,j). At 306, control selects a pair (i*,j*) whose $IoU_{i*,j*}$ is maximum.

At 308, control determines if $IoU_{i*,j*} > 0$. At 310, if $IoU_{i*,j*} > 0$, control assigns $r_n^{\sim k} = r_{i*}^k$, and $r_n^{\sim k-1} = r_{j*}^{k-1}$. Control adds $r_n^{\sim k}$ into $R_k^\sim$ and $r_n^{\sim k-1}$ into Control removes $r_{i*}^k$ from $R_k$ and $r_{j*}^{k-1}$ from $R_{k-1}$. Control increments n by 1 (i.e., n=n+1).

At 312, control determines if both $R_k$ and $R_{k-1}$ are not empty. Control returns to 304 if both $R_k$ and $R_{k-1}$ are not empty. Otherwise, control proceeds to 314 (i.e., if the condition that both $R_k$ and $R_{k-1}$ are not empty is not true). Control determines which of $R_k$ and $R_{k-1}$ is not empty as follows.

At 314, control determines if Rids not empty. If Rids not empty at 314, control proceeds to 316. At 316, control adds all the rest $r_i^k$ of $R_k$ as $r_n^{\sim k}$ into $R_k^\sim$. Control updates the index n. Control adds the same amount (i.e., number) of empty results as $r_n^{\sim k-1}$ into $R_{k-1}^\sim$. Thereafter, and if Rids empty at 314, control proceeds to 318.

At 318, control determines if $R_{k-1}$ is not empty. If $R_{k-1}$ is not empty at 318, control proceeds to 320. At 320, control adds all the rest $r_i^{k-1}$ of $R_{k-1}$ as $r_n^{\sim k-1}$ into $R_{k-1}^\sim$. Control updates the index n. Control adds the same amount (i.e., number) of empty results as $r_n^{\sim k}$ into $R_k^\sim$. Thereafter, and if $R_{k-1}$ is empty at 318, control ends.

If the number of objects in two consecutive frames is not the same, it may be due to objects moving in or out of the frames. One way to examine discontinuity of an object in two consecutive frames (an object absent in a previous frame appearing in a current frame or an object present in a previous frame disappearing in a current frame) is to determine if the object is on a boundary of a frame. If the object is on the boundary of the frame (likely moving in or out of the frame), the object can be removed from both frames and not considered as an indication of an error.

For example, in the paired perception results or sorted vectors $R_k^\sim$ and $R_{k-1}^\sim$, if the object $r_n^{\sim k}$ or $r_n^{\sim k-1}$ is on the boundary of the respective frame, then the objects $r_n^{\sim k}$ and $r_n^{\sim k-1}$ can be removed from the sorted vectors $R_k^\sim$ and $R_{k-1}^\sim$, respectively. When such objects on the boundary of a frame are removed from the sorted vector for the frame, the sorted vector is called a filtered sorted vector.

Next, Euclidian distance between the filtered sorted vectors is calculated as follows. Let $R_k^\sim = \{r_1^{\sim k}, r_2^{\sim k}, \ldots\}$ and $R_{k-1}^\sim = \{r_1^{\sim k-1}, r_2^{\sim k-1}, \ldots\}$ represent the filtered sorted vectors for frames k and k−1. Let $r_n^{\sim k}$ and $r_n^{\sim k-1}$ represent the objects in the respective filtered sorted vectors. The objects $r_n^{\sim k}$ and $r_n^{\sim k-1}$ are also vectors since they include class and coordinates (positional) information. Let $r_n^{\sim k} = [c_n^{\sim k}, x_{1,n}^{\sim k}, y_{1,n}^{\sim k}, x_{2,n}^{\sim k}, y_{2,n}^{\sim k}]$ and $r_n^{\sim k-1} = [c_n^{\sim k-1}, x_{1,n}^{\sim k-1}, y_{1,n}^{\sim k-1}, x_{2,n}^{\sim k-1}, y_{2,n}^{\sim k-1}]$.

First, for each object pair in the filtered sorted vectors, a distance between the objects in a pair (i.e., a distance between the same object) in two frames is calculated. A mean of the distances between the paired objects in the two vectors is calculated as $\Delta B_k$.

$$\Delta B_k = \text{mean}\left(\sqrt{\begin{array}{c}(\tilde{x}_{1,n}^k - \tilde{x}_{1,n}^{k-1})^2 + (\tilde{y}_{1,n}^k - \tilde{y}_{1,n}^{k-1})^2 + \\ (\tilde{x}_{2,n}^k - \tilde{x}_{2,n}^{k-1})^2 + (\tilde{y}_{2,n}^k - \tilde{x}_{2,n}^{k-1})^2\end{array}}\right)$$

Then a value for a type or class for the objects in a pair is determined using a lookup table. For example, as shown in an example of the lookup table in FIG. 4, if the class of an object in a pair in frame k is a car and in frame k−1 is also a car, the value for the class of the objects in the pair is 1. If the class of an object in a pair in frame k is a car and in frame k−1 is a van, the value for the class of the objects in the pair is 0.9, and so on. Then a mean of the class values of all the paired objects in the two filtered vectors is calculated as $\Delta C_k$.

$$\Delta C_k = 1 - \text{mean}(\text{lookup}(\tilde{c}_n^k, \tilde{c}_n^{k-1}))$$

The Euclidean distance $\Delta R_k$ between the two frames (i.e., between the two filtered sorted vectors) is a weighted or scaled sum of the two means $\Delta B_k$ and $\Delta C_k$ determined as above. That is, $\Delta R_k = w_b \Delta B_k + w_c \Delta C_k$. The default value for the weights $w_b$ and $w_c$ can be 1 and can be empirically calibrated/configured/optimized in combination with filtering.

For comparing raw data from the sensors, initially, the status of the vehicle—whether the vehicle is static (i.e., stationary) or dynamic (i.e., moving)—is determined. Depending on the vehicle status, different methods are used to process the raw data. Specifically, if the vehicle is at rest, an element-wise or pixel-wise comparison is performed between the data in two sequential frames using L2 norm. This provides the difference $\Delta D_k$ between the raw data $D_k$ and $D_{k-1}$ from frames k and k−1, respectively, as $\Delta D_k = \|D_{k-1} - D_k\|_2^2$. The subscript 2 denotes the L2 norm, and the superscript 2 indicates the element-wise square error obtained using the L2 norm.

If the vehicle is moving, the following feature matching and comparison methods can be used to determine the difference $\Delta D_k$ between the raw data $D_k$ and $D_{k-1}$ from frames k and k−1, respectively. Before describing these methods, a brief overview of scale invariant feature transform (SIFT) and speeded up robust features (SURF) used to generate feature sets is provided.

For any object in an image, points of interest on the object can be extracted to provide a feature description of the object. This description, extracted from a training image, can then be used to identify the object when attempting to locate the object in a test image containing many other objects. The scale invariant feature transform (SIFT) is a feature detection algorithm used to detect and describe local features in images. SIFT keypoints of objects are first extracted from a set of reference images and stored in a database. An object is recognized in a new image by individually comparing each feature from the new image to this database and finding candidate matching features based on Euclidean distance of their feature vectors. From the full set of matches, subsets of keypoints that agree on the object and its location, scale, and orientation in the new image are identified to filter out good matches. The determination of consistent clusters is performed rapidly by using an efficient hash table implementation of the generalized Hough transform. Each cluster of 3 or more features that agree on an object and its pose is then subjected to further detailed model verification and subsequently outliers are discarded. Finally the probability that a particular set of features indicates the presence of an object is computed, given the accuracy of fit and number of probable false matches. Object matches that pass all these tests can be identified as correct with high confidence. SIFT can robustly identify objects even among clutter and under partial occlusion because the SIFT feature descriptor is invariant to uniform scaling, orientation, illumination changes, and partially invariant to affine distortion.

Speeded up robust features (SURF) is also a feature detector and descriptor. The SURF algorithm is based on the same principles and steps as SIFT but details in each step are different. The SURF algorithm has three main components: interest point detection, local neighborhood description, and matching. Interest points can be found at different scales, partly since the search for correspondences often requires comparison images where they are seen at different scales. The goal of a descriptor is to provide a unique and robust description of an image feature, e.g., by describing the intensity distribution of the pixels within the neighborhood of the point of interest. Most descriptors are thus computed in a local manner, and a description is obtained for every point of interest identified previously. The dimensionality of the descriptor directly impacts both its computational complexity and point-matching robustness/accuracy. A short descriptor may be more robust against appearance variations but may not offer sufficient discrimination and thus give too many false positives. Initially, a reproducible orientation is fixed based on information from a circular region around the interest point. Then a square region is constructed and is aligned with the selected orientation, and the SURF descriptor is extracted from it. By comparing the SURF descriptors obtained from different images, matching pairs can be found.

FIG. 5 shows a system 400 that uses a first method for determining the difference $\Delta D_k$ between the raw data $D_k$ and $D_{k-1}$ from frames k and k−1, respectively, when the vehicle is moving. The system 400 comprises a feature extraction module 402, a feature matching module 404, and an error determining module 406.

In the first method, a SIFT/SURF feature represents keypoints in an image. Keypoints are points in an image carrying information relevant to or about the image. For example, keypoints in an image can include an attribute such as a corner, an intersection, a spatial shape or contour in the image. A keypoint descriptor vector represents all keypoints in a raw image.

Raw data $D_k$ and $D_{k-1}$ from frames k and k−1 are input to the feature extraction module 402 to obtain the keypoints. For raw data $D_k$ from frame k, using SIFT/SURF method, the feature extraction module 402 generates a feature set $F_k$, in which each element is a keypoint descriptor vector $f_{i,k}$. Accordingly, the feature set $F_k$ can be expressed as $F_k = \{f_{i,k} | i=1, 2, \ldots, I_k\}$.

Similarly, for raw data $D_{k-1}$ from frame k−1, using SIFT/SURF method, the feature extraction module 402 generates a feature set $F_{k-1}$, in which each element is another keypoint descriptor vector $f_{j,k-1}$. Accordingly, the feature set $F_{k-1}$ can be expressed as $F_{k-1} = \{f_{j,k-1} | i=1, 2, \ldots, J_{k-1}\}$.

Then the feature matching module 404 performs feature matching between the two frames k and k−1. The feature matching is similar to the object pairing described above with reference to FIGS. 2 and 3 except that keypoints are paired in the feature matching instead of pairing objects. The feature matching module 404 performs the feature matching using the following method to determine a distance between the keypoint descriptor vectors of the two sequential frames k and k−1.

Initially, the feature matching module 404 sets Count=0. For j in $\{1, 2, \ldots, J_{k-1}\}$, the feature matching module 404 determines distance $d_{j,i} = \|f_{j,k-1} - f_{i,k}\|$ for i in $\{1, 2, \ldots, I_k\}$. The feature matching module 404 identifies m,n in $\{1, 2, \ldots, I_k\}$ such that $d_{j,m}$ and $d_{j,n}$ are the minimum and second minimum (i.e., the smallest and next to the smallest) values in $\{d_{j,i} | i=1, 2, \ldots, I_k\}$. The feature matching module 404 increments the value of Count if the ratio $d_{j,m}/d_{j,n}$ is less than a threshold value.

Then the error determining module 406 determines an error representing a distance or difference between the frames k and k−1 as $E = 1 - \text{Count}/J_{k-1}$. This error indicates how many features in $D_{k-1}$ are missed in $D_k$. Similarly, the error determining module 406 can calculate another error indicating how many features in $D_k$ are missed in $D_{k-1}$. These errors represent the discontinuity between the two frames and should be less than a threshold. If the error is greater than the threshold, $D_k$ is suspicious. For example, if a frame between the two frames is lost, the error will be large. As another example, if one of the cameras is faulty or blocked, causing one of the frames to be incomplete, the error will be large. The threshold will dynamically depend on factors such as the speed of the vehicle, the position/location of the camera in the vehicle, and so on. Depending on these factors and the threshold, the value of the error may be an expected value and therefore may not indicate a fault in the sensor, or may be an unexpected value and therefore may indicate a fault in the senor.

Figure 6:
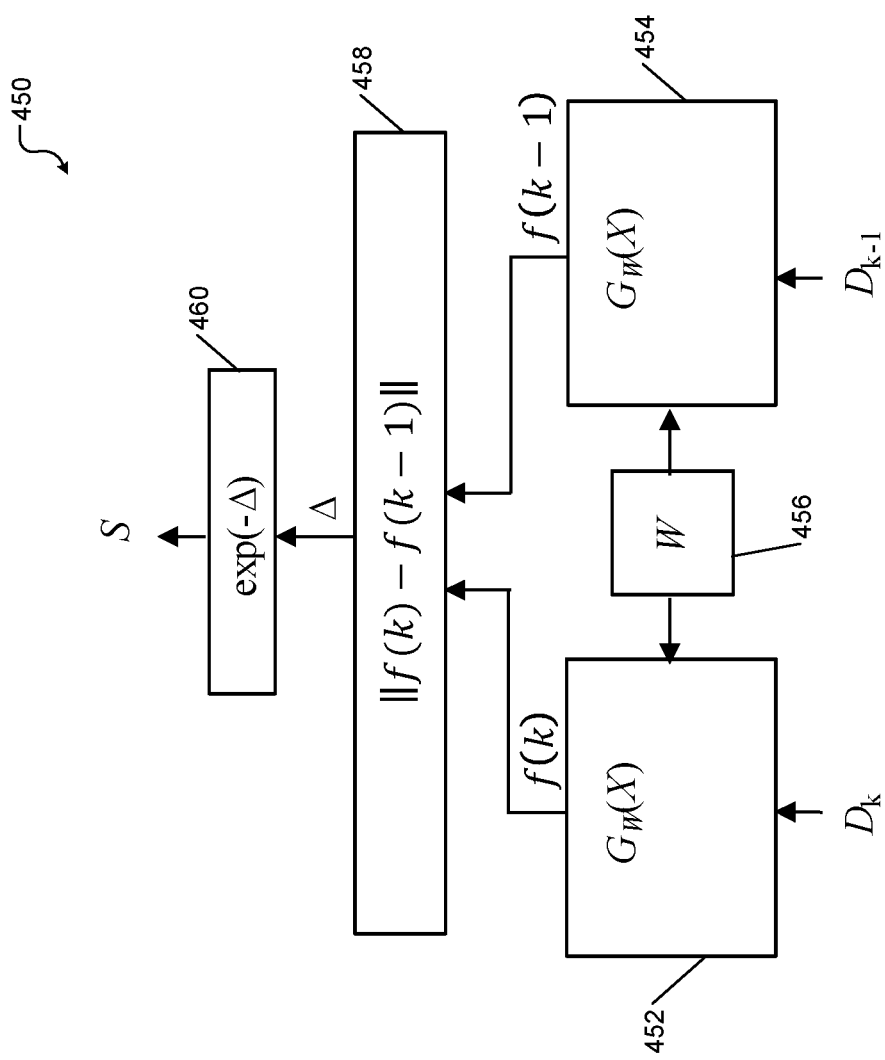
FIG. 6 shows a neural network based system for determining a difference between two frames.

FIG. 6 shows a system 450 that uses a second method for determining the difference $\Delta D_k$ between the raw data $D_k$ and $D_{k-1}$ from frames k and k-1, respectively, when the vehicle is moving. The system 450 comprises a first neural network 452, a second neural network 454, weights 456, a distance calculating module 458, and a normalizing module 460.

In the second alternative method, a neural network is used to generate feature values. Specifically, a neural network model is trained using inputs from videos to identify and determine differences between frames. The trained neural network model can calculate the distance or error between two frames.

In use, as shown in FIG. 6, two identical trained neural network models $G_w(X)$ 452, 454 that share the same weights W 456 receive the raw data $D_k$ and $D_{k-1}$ from the two frames k and k-1 and output features $f_k$ and $f_{k-1}$, respectively. In general, $f_i=G_w(X_i)$. The distance calculating module 458 calculates Euclidean distance between the features $f_k$ and $f_{k-1}$ as $\Delta=\|f_k-f_{k-1}\|$. The distance indicates a difference between the features $f_k$ and $f_{k-1}$. In general, $\Delta_{i,j}=\|f(i)-f(j)\|$. The difference or the distance $\Delta$ between the two features $f_k$ and $f_{k-1}$ is normalized by the normalizing module 460 to a score value S between 0 and 1 using an exponential function, for example. In general, $S_{i,j}=e^{\wedge}(-\Delta_{i,j})$.

Figure 7:
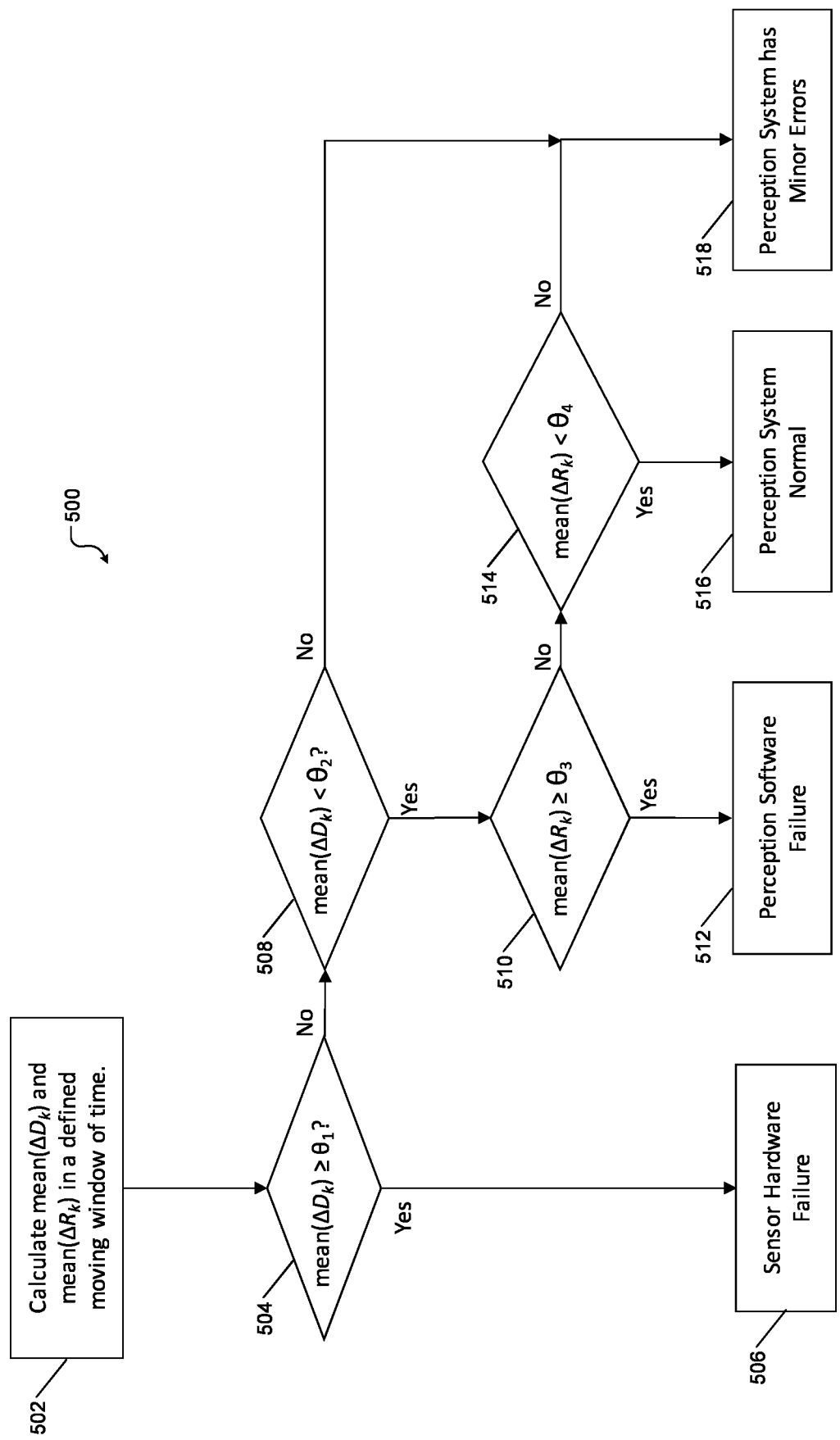
FIG. 7 shows a flowchart of a method for diagnosing a fault in the perception system.

FIG. 7 shows a diagnostics method 500. At 502, control calculates mean values of $\Delta D_k$ and $\Delta R_k$ collected over a moving window. At 504, control determines if the mean $\Delta D_k$ is greater than or equal to a first threshold. At 506, if the mean $\Delta D_k$ is greater than or equal to the first threshold, control indicates a fault in sensor hardware (e.g., a faulty camera), and a fault mitigation procedure is followed.

At 508, if the mean $\Delta D_k$ is not greater than or equal to the first threshold, control determines if the mean $\Delta D_k$ is less than a second threshold, where the second threshold is less than the first threshold. At 510, if the mean $\Delta D_k$ is less than the second threshold, control determines if the mean $\Delta R_k$ is greater than or equal to a third threshold. At 512, if the mean $\Delta R_k$ is greater than or equal to the third threshold, control indicates a fault in the perception system (e.g., perception software error), and a fault mitigation procedure is followed.

At 514, if the mean $\Delta R_k$ is not greater than or equal to the third threshold, control determines if the mean $\Delta R_k$ is less than a fourth threshold, where the fourth threshold is less than the third threshold. At 516, if the mean $\Delta R_k$ is less than the fourth threshold, control indicates that the perception system is functioning or operating normally (i.e., without error).

At 508, if the mean $\Delta D_k$ is not less than the second threshold, control proceeds to 518. At 514, if the mean $\Delta R_k$ is not less than the fourth threshold, control proceeds to 518. At 518, control indicates a minor or non-severe error in the perception system. For example, control may generate a warning indicating a minor or non-severe error in the perception system. For example, the mean $\Delta D_k$ and mean $\Delta R_k$ values can be sent to a cloud based system (e.g., to one or more servers shown in FIGS. 9A and 9B) for further analysis.

The diagnostics method 500 can be triggered based on many different conditions. Non-limiting examples of such conditions include the following. For example, the diagnostics method can be performed periodically (e.g., every N minutes, after every ignition, after X minutes after every ignition, after Y minutes after the vehicle begins to move after coming to a stop such as at a traffic light or sign, and so on). For example, the diagnostics method can be triggered every time the vehicle approaches or passes through a particular intersection or a location (e.g., in a downtown area), where there may be a chance of a perception error. For example, the diagnostics method can be triggered more infrequently on highways that in cities. For example, the diagnostics method can be performed continuously without regard to any triggering conditions. Other examples of additional factors or considerations (bases) that can trigger the diagnostics method are contemplated.

Non-limiting examples of mitigation procedures include the following. For example, if the diagnostics method indicates a sensor failure (e.g., one of the cameras is not working properly), the mitigation procedure can include disregarding that sensor and using another sensor (e.g., another camera) instead. For example, if the diagnostics method indicates a fault in the perception system (i.e., if perception system results are incorrect), the mitigation procedure can include alerting the passenger to immediately take control of the vehicle and disengage self-driving feature. For example, such an alert message can be output audio-visually via an infotainment subsystem of the vehicle. Depending on the severity of the fault, the mitigation procedure can also include pulling over the vehicle to the roadside (e.g., using an autonomous subsystem of the vehicle). Additional examples of mitigation procedures are contemplated.

FIGS. 8A and 8B show a system 600 for diagnosing and mitigating faults in a perception system of a vehicle. The system 600 utilizes the architecture of the system 100 shown in FIG. 1 and utilizes the systems and methods shown in FIGS. 2-7.

In FIG. 8A, the system 600 comprises a plurality of sensors 602 distributed throughout the vehicle. The system 600 further comprises a perception system 604 according to the present disclosure. The perception system may communicate with various subsystems 606 of the vehicle.

Figure 9B:
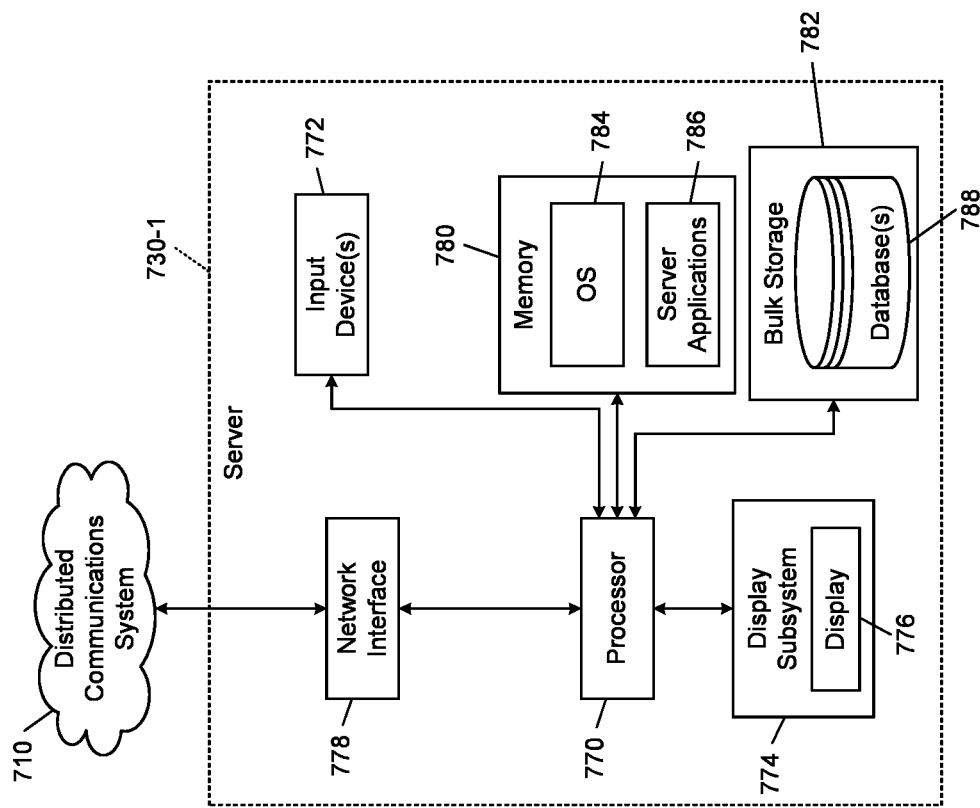
FIG. 9B shows a simplified example of a server of the distributed computing system of FIG. 9A.

For example, the subsystems 606 can include but are not limited to an infotainment subsystem (e.g., to provide alerts), an autonomous or self-driving subsystem (e.g., to control the vehicle, mitigate faults, etc.), a braking subsystem, a speed control subsystem, a navigation subsystem, a communication subsystem (e.g., to communicate with a cloud-based back end system shown in FIGS. 9A and 9B), etc.

For example, one of the subsystems 606 may indicate to the perception system 604 when the vehicle is stationary or moving. Accordingly, the perception system 604 can select and use a proper method for fault detection and fault isolation as described above in detail.

The perception system 604 comprises a comparing module 610, a perception module 612, a diagnostics module 614, and a mitigation module 616. As shown in FIG. 8B, the perception module 612 comprises a result generating module 618, a pairing module 620, a filtering module 624, and a distance determining module 626.

The sensors 602 sense the surroundings of the vehicle and provide raw data to the perception system 604. In the perception system 604, the comparing module 610 compares the raw data from two frames. The comparing module 610 performs the L2 norm based method for determining the first difference $\Delta D_k$ between the raw data from the two frames when the vehicle is stationary, as described above. The comparing module 610 further comprises the systems 400 and 450 shown in FIGS. 5 and 6 that are used to determine the first difference $\Delta D_k$ between the raw data from the two frames when the vehicle is moving.

The perception module 612 generates the perception results or perception result vectors $R_k$ and $R_{k-1}$ based on the raw data from the two frames. Specifically, in the perception module 612, the result generating module 618 generates the perception results or perception result vectors $R_k$ and $R_{k-1}$ based on the raw data $D_k$ and $D_{k-1}$ from the two frames k and k−1. The pairing module 620 performs the method 300 shown and described with reference to FIG. 3 above to match the elements (objects) in the two vectors as described with reference to FIGS. 2 and 3 above. The filtering module 624 performs the filtering of boundary objects from the two vectors as described above. The distance determining module 626 determines the Euclidean distance between the filtered sorted vectors (i.e., between the two frames) and generates the second difference $\Delta R_k$ between the two frames as described above in detail.

The diagnostics module 614 diagnoses faults in the sensors 602 and in the perception module 604 using the method 500 shown and described with reference to FIG. 7 above. The mitigation module 616 performs mitigation procedures depending on the detected faults as described above.

Below are simplistic examples of a distributed computing environment in which the systems and methods of the present disclosure can be implemented. Throughout the description, references to terms such as servers, client devices, applications and so on are for illustrative purposes only. The terms server and client device are to be understood broadly as representing computing devices with one or more processors and memory configured to execute machine readable instructions. The terms application and computer program are to be understood broadly as representing machine readable instructions executable by the computing devices.

FIG. 9A shows a simplified example of a distributed computing system 700. The distributed computing system 700 includes a distributed communications system 710, one or more vehicles 720-1, 720-2, ..., and 720-M (collectively, vehicles 720), and one or more servers 730-1, 730-2, ..., and 730-N (collectively, servers 730). M and N are integers greater than or equal to one.

The distributed communications system 710 may include a local area network (LAN), a wide area network (WAN) such as the Internet, or other type of network. The vehicles 720 and the servers 730 may be located at different geographical locations and may communicate with each other via the distributed communications system 710. For examples the servers 730 may be located in a data center in a cloud. The vehicles 720 and the servers 730 may connect to the distributed communications system 710 using wireless and/or wired connections.

The vehicles 720 may include systems shown and described above with reference to FIGS. 1-8B that may execute software applications such as the various methods described above with reference to FIGS. 1-8B. The servers 730 may provide multiple services to the client devices 720. For example, the servers 730 may execute software applications developed by one or more vendors (e.g., a backend system for diagnosing and mitigating faults as described above). The servers 730 may host multiple databases that are relied on by the software applications in providing services to users of the vehicles 720.

FIG. 9B shows a simplified example of the server 730-1. The server 730-1 typically includes one or more CPUs or processors 770, a network interface 778, memory 780, and bulk storage 782. In some implementations, the server 730-1 may be a general-purpose server and include one or more input devices 772 (e.g., a keypad, touchpad, mouse, and so on) and a display subsystem 774 including a display 776.

The network interface 778 connects the server 730-1 to the distributed communications system 710. For example, the network interface 778 may include a wired interface (e.g., an Ethernet interface) and/or a wireless interface (e.g., a Wi-Fi, Bluetooth, near field communication (NFC), or other wireless interface). The memory 780 may include volatile or nonvolatile memory, cache, or other type of memory. The bulk storage 782 may include flash memory, one or more magnetic hard disk drives (HDDs), or other bulk storage devices.

The processor 770 of the server 730-1 executes an operating system (OS) 784 and one or more server applications 786 (e.g., the backend system for diagnosing and mitigating faults and/or for further analyzing minor or non-critical faults as described above), which may be housed in a virtual machine hypervisor or containerized architecture. The bulk storage 782 may store one or more databases 788 that store data structures used by the server applications 786 to perform respective functions.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
   a comparing module configured to:
      receive first data regarding surroundings of a vehicle from a plurality of sensors in the vehicle;
      receive second data regarding the surroundings from the plurality of sensors after receiving the first data;
      compare the first data to the second data; and
      determine a first difference between the first data and the second data based on the comparison of the first data to the second data;
   a perception module configured to:
      generate a first set of perception results based on the first data;
      generate a second set of perception results based on the second data; and
      determine a second difference between the first data and the second data based on the first set of perception results and the second set of perception results;
   a diagnostics module configured to determine whether one of the sensors or the perception module is faulty based on a combination of the first difference and the second difference; and
   a mitigation module configured to perform a mitigation procedure in response to the diagnostics module diagnosing a fault in one of the plurality of sensors or the perception module, the mitigation procedure comprising alerting an occupant of the vehicle to pull over the vehicle to the roadside depending on the severity of the fault, alerting the occupant to take control of the vehicle and disengage self-driving feature, or disregarding the faulty sensor and using another sensor from the plurality of sensors.

2. The system of claim 1 wherein the diagnostics module is further configured to determine whether one of the sensors or the perception module is faulty based on a plurality of each of the first difference and the second difference averaged over a moving window.

3. The system of claim 1 wherein in response to the vehicle being stationary, the comparing module is further configured to compare the first data to the second data by performing an element-wise comparison between elements of the first data and the second data.

4. The system of claim 1 wherein in response to the vehicle being in motion, the comparing module is further configured to: compare the first data to the second data by identifying features from the first data and the second data and by matching the features; and determine the first difference between the first data and the second data based on the matching.

5. The system of claim 1 wherein the comparing module further comprises a plurality of identical neural network models trained to identify features in input data and to output the features using identical weights, and wherein the comparing module is configured to: input the first and second data respectively to first and second neural network models of the plurality of neural network models; receive first and second features respectively from the first and second neural network models; calculate Euclidean distance between the first and second features; and generate a score by normalizing the Euclidean distance, wherein the score indicates the first difference between the first data and the second data.

6. The system of claim 1 wherein the comparing module further comprises: a pairing module configured to pair objects in the first set of perception results with objects in the second set of perception results based on intersection over union values for all pairs of the objects; a filtering module configured to filter objects with coordinates proximate to outer edges of the first and second sets of perception results from the paired objects; and a distance determining module configured to determine Euclidean distance between the first and second sets of perception results based on the filtered paired objects, wherein the Euclidean distance represents the second difference.

7. The system of claim 6 wherein the pairing module is further configured to: pair the objects in the first set of perception results with objects in the second set of perception results based on a decreasing order of the intersection over union values for all the pairs of the objects in an iterative manner; and sort the first and second sets of perception results using the paired objects.

8. The system of claim 7 wherein the filtering module is further configured to generate filtered sorted first and second sets of perception results after filtering the objects with coordinates proximate to the outer edges of the first and second sets of perception results from the paired objects.

9. The system of claim 8 wherein the distance determining module is further configured to determine the Euclidean distance between the first and second sets of perception results by: generating a first mean value of distances between the paired objects in the filtered sorted first and second sets of perception results; generating a second mean value based on types of the paired objects using a lookup table; scaling the first and second mean values by respective weights; and combining the weighted first and second mean values.

10. A method comprising:
receiving first data regarding surroundings of a vehicle from a plurality of sensors in the vehicle;
receiving second data regarding the surroundings from the plurality of sensors after receiving the first data;
comparing the first data to the second data;
determining a first difference between the first data and the second data based on the comparison of the first data to the second data;
generating a first set of perception results based on the first data using a perception module;
generating a second set of perception results based on the second data using the perception module;
determining a second difference between the first data and the second data based on the first set of perception results and the second set of perception results using the perception module;
determining whether one of the plurality of sensors or the perception module is faulty based on a combination of the first difference and the second difference; and
performing a mitigation procedure in response to diagnosing a fault in one of the plurality of sensors or the perception module, the mitigation procedure comprising alerting an occupant of the vehicle to pull over the vehicle to the roadside depending on the severity of the fault, alerting the occupant to take control of the vehicle and disengage self-driving feature, or disregarding the faulty sensor and using another sensor from the plurality of sensors.

11. The method of claim 10 further comprising determining whether one of the plurality of sensors or the perception module is faulty by averaging a plurality of each of the first difference and the second difference over a moving window.

12. The method of claim 10 further comprising, in response to the vehicle being stationary, comparing the first data to the second data by performing an element-wise comparison between elements of the first data and the second data.

13. The method of claim 10 further comprising, in response to the vehicle being in motion:
comparing the first data to the second data by identifying features from the first data and the second data and matching the features; and
determining the first difference between the first data and the second data based on the matching.

14. The method of claim 10 further comprising:
selecting first and second neural network models from a plurality of identical neural network models trained to identify features in input data and to output the features using identical weights;
inputting the first and second data respectively to the first and second neural network models;
receiving first and second features respectively from the first and second neural network models;
calculating Euclidean distance between the first and second features; and
generating a score by normalizing the Euclidean distance, wherein the score indicates the first difference between the first data and the second data.

15. The method of claim 10 further comprising:
pairing objects in the first set of perception results with objects in the second set of perception results based on intersection over union values for all pairs of the objects;
filtering objects with coordinates proximate to outer edges of the first and second sets of perception results from the paired objects; and
determining Euclidean distance between the first and second sets of perception results based on a filtered paired objects, wherein the Euclidean distance represents the second difference.

16. The method of claim 15 wherein the pairing further comprises:
pairing the objects in the first set of perception results with objects in the second set of perception results based on a decreasing order of the intersection over union values for all the pairs of the objects in an iterative manner; and sorting the first and second sets of perception results using the paired objects.

17. The method of claim 16 wherein the filtering further comprises generating filtered sorted first and second sets of perception results after filtering the objects with coordinates proximate to the outer edges of the first and second sets of perception results from the paired objects.

18. The method of claim 17 further comprises determining the Euclidean distance between the first and second sets of perception results by:

generating a first mean value of distances between the paired objects in the filtered sorted first and second sets of perception results;

generating a second mean value based on types of the paired objects using a lookup table;

scaling the first and second mean values by respective weights; and combining the weighted first and second mean values.

* * * * *